United States Patent
Colletti

(10) Patent No.: US 10,611,299 B1
(45) Date of Patent: Apr. 7, 2020

(54) ARTICULATING ARMREST LIGHT ASSEMBLY

(71) Applicant: The Boeing Company, Chicago, IL (US)

(72) Inventor: Brian P. Colletti, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 16/133,996

(22) Filed: Sep. 18, 2018

(51) Int. Cl.
| | |
|---|---|
| *B64D 11/00* | (2006.01) |
| *B64D 11/06* | (2006.01) |
| *B60Q 3/56* | (2017.01) |
| *B60Q 3/47* | (2017.01) |
| *F21V 21/28* | (2006.01) |
| *B64F 5/40* | (2017.01) |
| *B60Q 3/233* | (2017.01) |
| *B64F 5/10* | (2017.01) |

(52) U.S. Cl.
CPC ............... *B60Q 3/56* (2017.02); *B60Q 3/233* (2017.02); *B60Q 3/47* (2017.02); *B64D 11/00* (2013.01); *B64D 11/0646* (2014.12); *B64F 5/10* (2017.01); *B64F 5/40* (2017.01); *F21V 21/28* (2013.01); *B64D 2011/0053* (2013.01)

(58) Field of Classification Search
CPC ... B64D 11/06; B64D 11/064; B64D 11/0638; B64D 11/0641; B64D 11/00151; B64D 11/0015; B64D 11/0646; B60N 2/753
See application file for complete search history.

(56) References Cited

U.S. PATENT DOCUMENTS

| | | | |
|---|---|---|---|
| 5,398,991 A | 3/1995 | Smith et al. | |
| 6,199,999 B1 * | 3/2001 | Cotton, Jr. ............. | A47C 7/725 297/217.6 |
| 9,457,711 B2 * | 10/2016 | Hayashi ................... | B60Q 3/64 |
| 2003/0085597 A1 | 5/2003 | Ludeke et al. | |
| 2005/0012375 A1 | 1/2005 | Giasson | |

(Continued)

FOREIGN PATENT DOCUMENTS

| | | |
|---|---|---|
| JP | H04131352 U | 12/1992 |
| JP | H10241447 A | 9/1998 |
| KR | 19980011382 U | 5/1998 |

OTHER PUBLICATIONS

European Search Report for EP application No. 19198101.8 dated Dec. 6, 2019, pp. 1-6.

*Primary Examiner* — Shin H Kim
(74) *Attorney, Agent, or Firm* — Coats + Bennett, PLLC

(57) ABSTRACT

An armrest assembly for a passenger vehicle, such as an aircraft, that includes a light source, a seat assembly that includes the armrest assembly, and related method(s) of manufacturing or servicing. In general, the armrest assembly includes a light source that is supported by an articulating support such that it can be positioned in a variety of locations. The articulating support is pivotally mounted to an armrest in a forward portion of a side notch that extends along the lateral edge of the armrest. The armrest assembly is configured such that the light source is disposed in the side notch and oriented to direct light from the side notch away from the armrest when the light assembly is in a stowed configuration. The articulating support may be moved so that the light source is disposed out of the side notch, so as to provide a reading light.

20 Claims, 9 Drawing Sheets

(56) References Cited

U.S. PATENT DOCUMENTS

| | | | |
|---|---|---|---|
| 2008/0185887 A1* | 8/2008 | Merensky | B64D 11/0604 297/217.3 |
| 2013/0003404 A1* | 1/2013 | Hayashi | B60Q 3/64 362/546 |
| 2013/0285422 A1* | 10/2013 | Tscherwitschke | B60N 2/242 297/217.6 |
| 2014/0265481 A1* | 9/2014 | Riedel | B64D 11/06 297/217.4 |
| 2015/0336485 A1* | 11/2015 | Lee | B60N 2/242 297/248 |
| 2017/0021928 A1 | 1/2017 | Satterfield | |

* cited by examiner

ARTICULATING ARMREST LIGHT ASSEMBLY

TECHNOLOGICAL FIELD

The present disclosure relates generally to convenience and/or emergency lighting for a passenger vehicle, such as an aircraft, and to related armrest assemblies, seat assemblies, and methods of manufacturing and/or servicing.

BACKGROUND

When passengers are seated in a seat of a passenger vehicle, such as an aircraft, a watercraft, and/or a land vehicle, the passengers frequently desire to have additional lighting to facilitate reading and the like. For example, commercial aircraft are typically equipped with a plurality of overhead lighting units, with each lighting unit positioned to provide light to a corresponding individual seat position. However, use of such lights may be undesirable for a variety of reasons, including difficulty in properly positioning the light, undesirable light being cast on/near adjacent seat positions, difficulty in reaching the corresponding light switch, and the like.

Accordingly, there is a need for alternative approaches to providing convenience and/or emergency light to passengers in a passenger vehicle. Such approaches should advantageously be adjustable by the passenger, and be space efficient.

SUMMARY

Aspects of the present disclosure are generally directed to an armrest assembly that includes a light source, a seat assembly that includes the armrest assembly, and related method(s) of manufacturing or servicing. In general, the armrest assembly includes a light assembly and an armrest. The light assembly includes a light source that is supported by an articulating support such that it can be positioned in a variety of locations. The articulating support is pivotally mounted to the armrest in a forward portion of a side notch of the armrest that extends along the lateral edge of the armrest. The armrest assembly is configured such that the light source is disposed in the side notch and oriented to direct light from the side notch away from the armrest when the light assembly is in a stowed configuration. The articulating support may be moved so that the light source is disposed out of the side notch, so as to provide a reading light.

In one or more aspects, the present disclosure is directed to an armrest assembly for a passenger vehicle. The armrest assembly includes an armrest and a light assembly. The armrest has an upper surface extending along a first longitudinal axis. The armrest has a side notch defined therein, with the side notch extending parallel to the first longitudinal axis and disposed at a lateral edge of the upper surface such that the side notch defines a lateral boundary of the upper surface. The side notch has a forward portion and a rearward portion. The light assembly is moveably mounted to the armrest and has an articulating support and a light source. The articulating support has a base section pivotally mounted to the armrest in the forward portion of the side notch and an opposing free end. The light source is mounted to the articulating support so as to be closer to the free end than the base section. The light assembly is movable between a stowed configuration and at least one deployed configuration. When the light assembly is in the stowed configuration: 1) both the articulating support and the light source of the light assembly are disposed in the side notch; 2) the articulating support is disposed parallel to the first longitudinal axis; and 3) the light source is oriented to direct light from the side notch away from the armrest. When the light assembly is in the deployed configuration: 1) the free end of the articulating support is disposed outside the side notch; and 2) the light source is disposed outside the side notch.

In one or more other aspects, the present disclosure is directed to a seat assembly for a passenger vehicle. The seat assembly includes a passenger seat and an armrest assembly disposed adjacent the passenger seat. The armrest assembly includes an armrest and a light assembly. The armrest has an upper surface extending along a first longitudinal axis. The armrest has a side notch defined therein, with the side notch extending parallel to the first longitudinal axis and disposed at a lateral edge of the upper surface such that the side notch defines a lateral boundary of the upper surface. The side notch has a forward portion and a rearward portion. The light assembly is moveably mounted to the armrest and has an articulating support and a light source. The articulating support has a base section pivotally mounted to the armrest in the forward portion of the side notch and an opposing free end. The light source is mounted to the articulating support so as to be closer to the free end than the base section. The light assembly is movable between a stowed configuration and at least one deployed configuration. When the light assembly is in the stowed configuration: 1) both the articulating support and the light source of the light assembly are disposed in the side notch; 2) the articulating support is disposed parallel to the first longitudinal axis; and 3) the light source is oriented to direct light from the side notch away from the armrest. When the light assembly is in the deployed configuration: 1) the free end of the articulating support is disposed outside the side notch; and 2) the light source is disposed outside the side notch.

In one or more other aspects, the present disclosure is directed to a method of manufacturing or servicing an aircraft having a passenger cabin. The method includes installing an armrest assembly in the passenger cabin adjacent a passenger seat. The armrest assembly includes an armrest and a light assembly. The armrest has an upper surface extending along a first longitudinal axis. The armrest has a side notch defined therein, with the side notch extending parallel to the first longitudinal axis and disposed at a lateral edge of the upper surface such that the side notch defines a lateral boundary of the upper surface. The side notch has a forward portion and a rearward portion. The light assembly is moveably mounted to the armrest and has an articulating support and a light source. The articulating support has a base section pivotally mounted to the armrest in the forward portion of the side notch and an opposing free end. The light source is mounted to the articulating support so as to be closer to the free end than the base section. The light assembly is movable between a stowed configuration and at least one deployed configuration. When the light assembly is in the stowed configuration: 1) both the articulating support and the light source of the light assembly are disposed in the side notch; 2) the articulating support is disposed parallel to the first longitudinal axis; and 3) the light source is oriented to direct light from the side notch away from the armrest. When the light assembly is in the deployed configuration: 1) the free end of the articulating support is disposed outside the side notch; and 2) the light source is disposed outside the side notch. In some aspects, the method optionally further includes: 1) moving the light assembly from the stowed configuration to the deployed configuration; and 2) shining light from the light source toward the passenger seat while the light assembly is in the deployed configuration.

In some aspects of the armrest assembly itself and/or the armrest assembly as part of the seat assembly, and/or the related methods, the articulating support comprises a first segment, a second segment, and a third segment, arranged in series. The first segment is moveably mounted to the armrest in the forward portion of the side notch for rotation about a first pivot axis. The first segment has a proximal portion through which the first pivot axis extends, and a distal portion. The second segment is moveably mounted to the distal portion of the first segment for rotation relative to the first segment. The third segment is moveably mounted to the second segment opposite the first segment. The light source is disposed in the third segment. In some aspects, the third segment is constrained to remain disposed parallel to the second segment and constrained to a single degree of freedom relative to the second segment. For example, the third segment is rotatable relative to the second segment about a second longitudinal axis of the second segment.

The features, functions, and advantages that have been discussed can be achieved independently in various aspects or may be combined in yet other aspects further details of which can be seen with reference to the following description and the drawings.

BRIEF DESCRIPTION OF THE DRAWINGS

Having thus described the disclosure in general terms, reference will now be made to the accompanying drawings, which are not necessarily drawn to scale.

Figure 1:
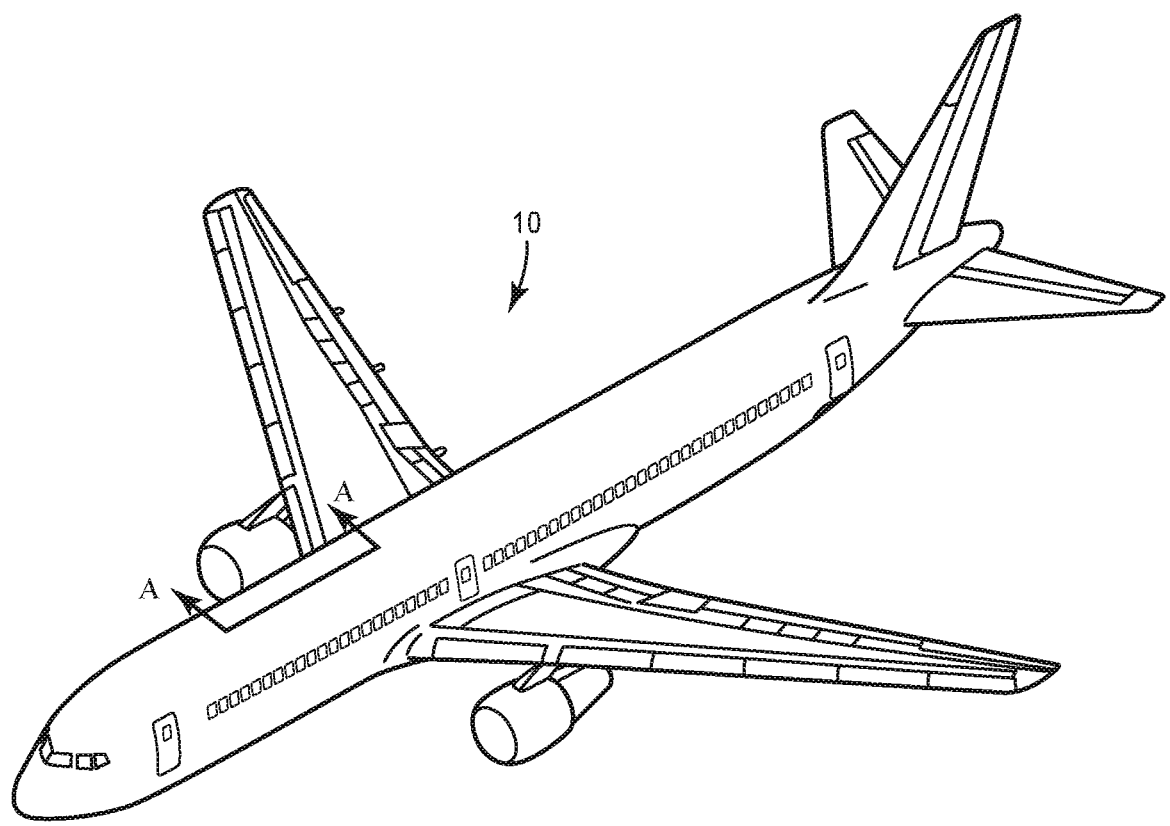

FIG. 1 shows a perspective view of an exemplary aircraft that incorporates aspects of the present disclosure.

Figure 2:
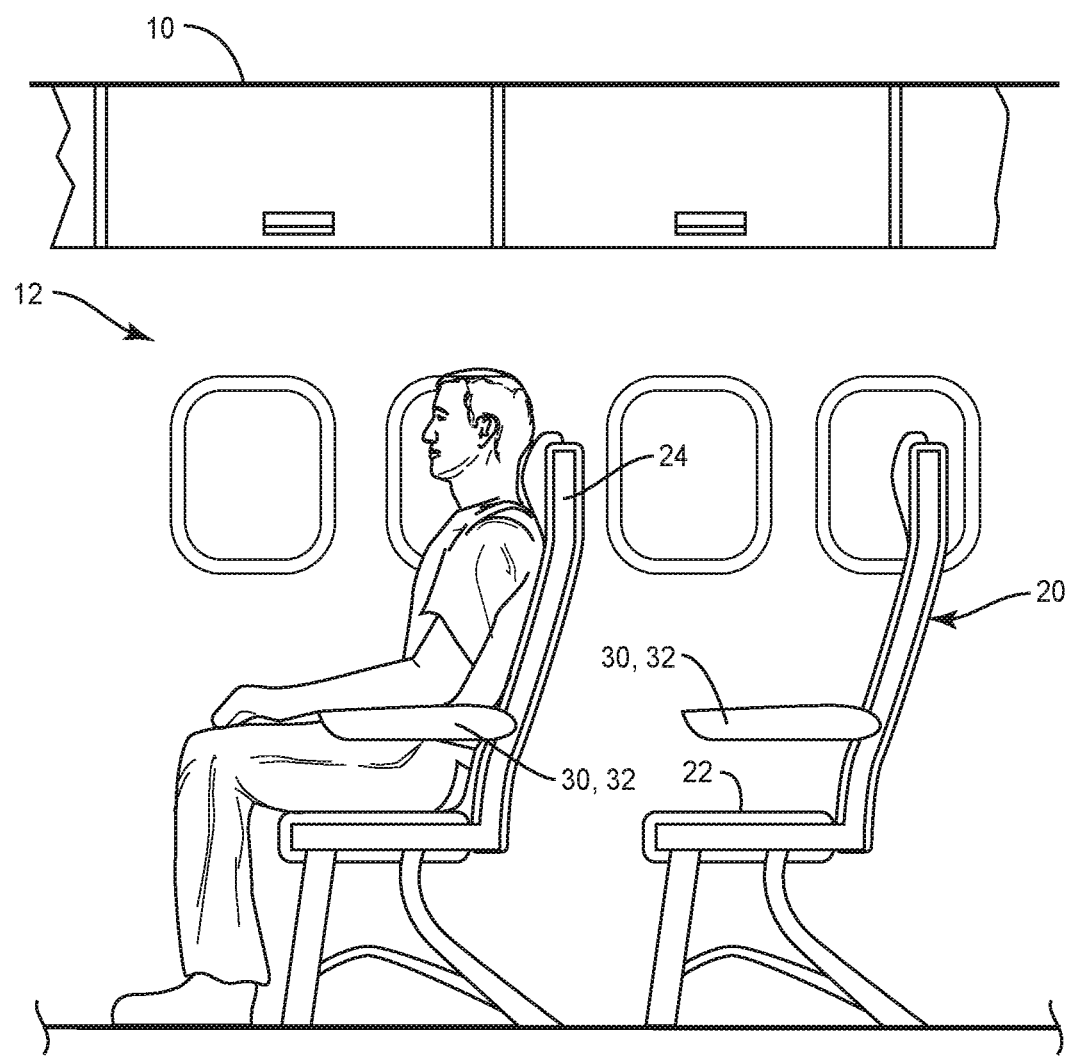

FIG. 2. shows a partial cross-sectional view of the aircraft of FIG. 1 along line A-A, showing a portion of the passenger cabin.

Figure 3:
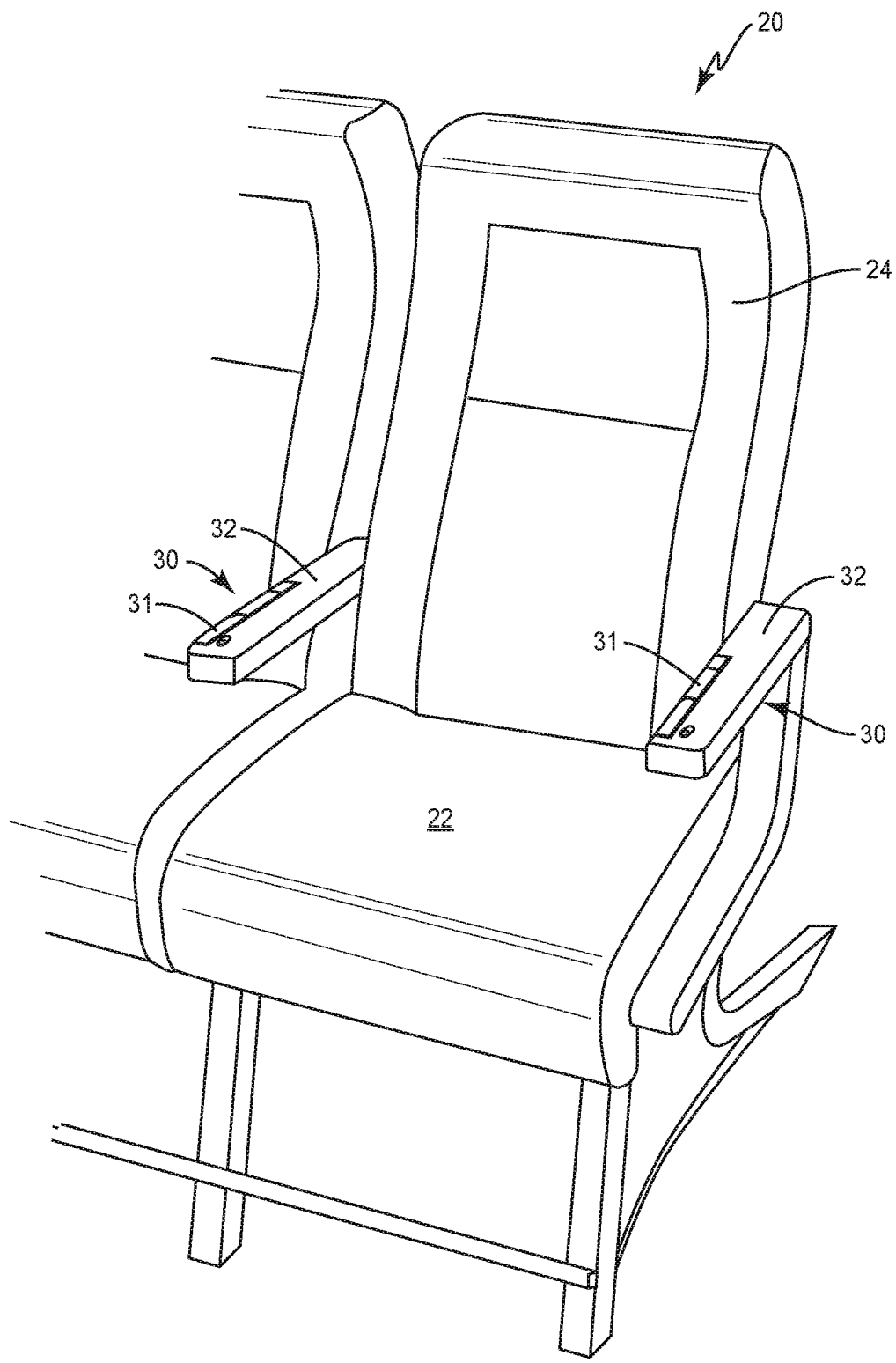

FIG. 3 shows a perspective view of a seat assembly having an armrest assembly that incorporates aspects of the present disclosure.

Figure 4:
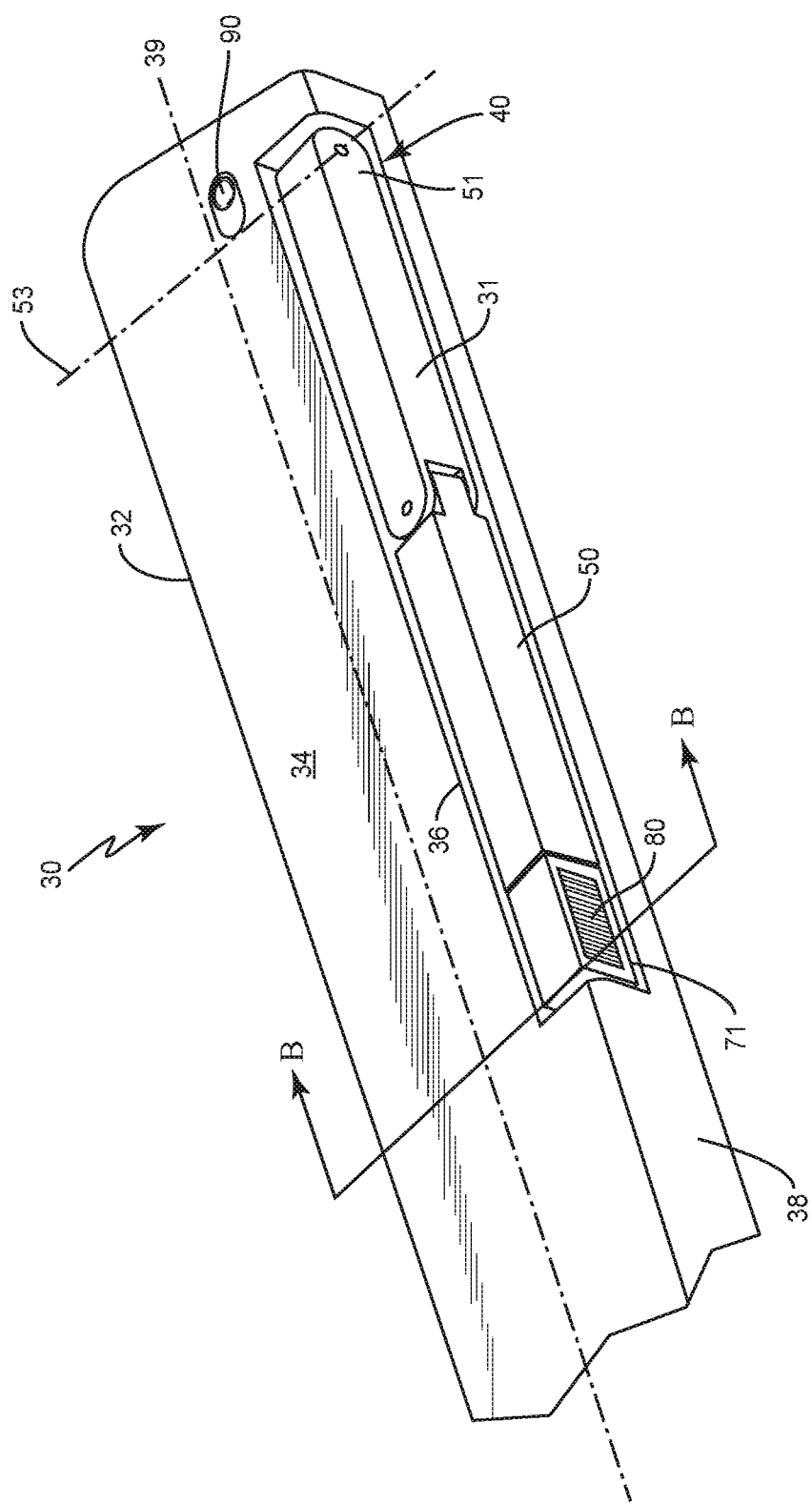

FIG. 4 shows a perspective view of the armrest assembly of FIG. 3 in a stowed configuration.

Figure 5:
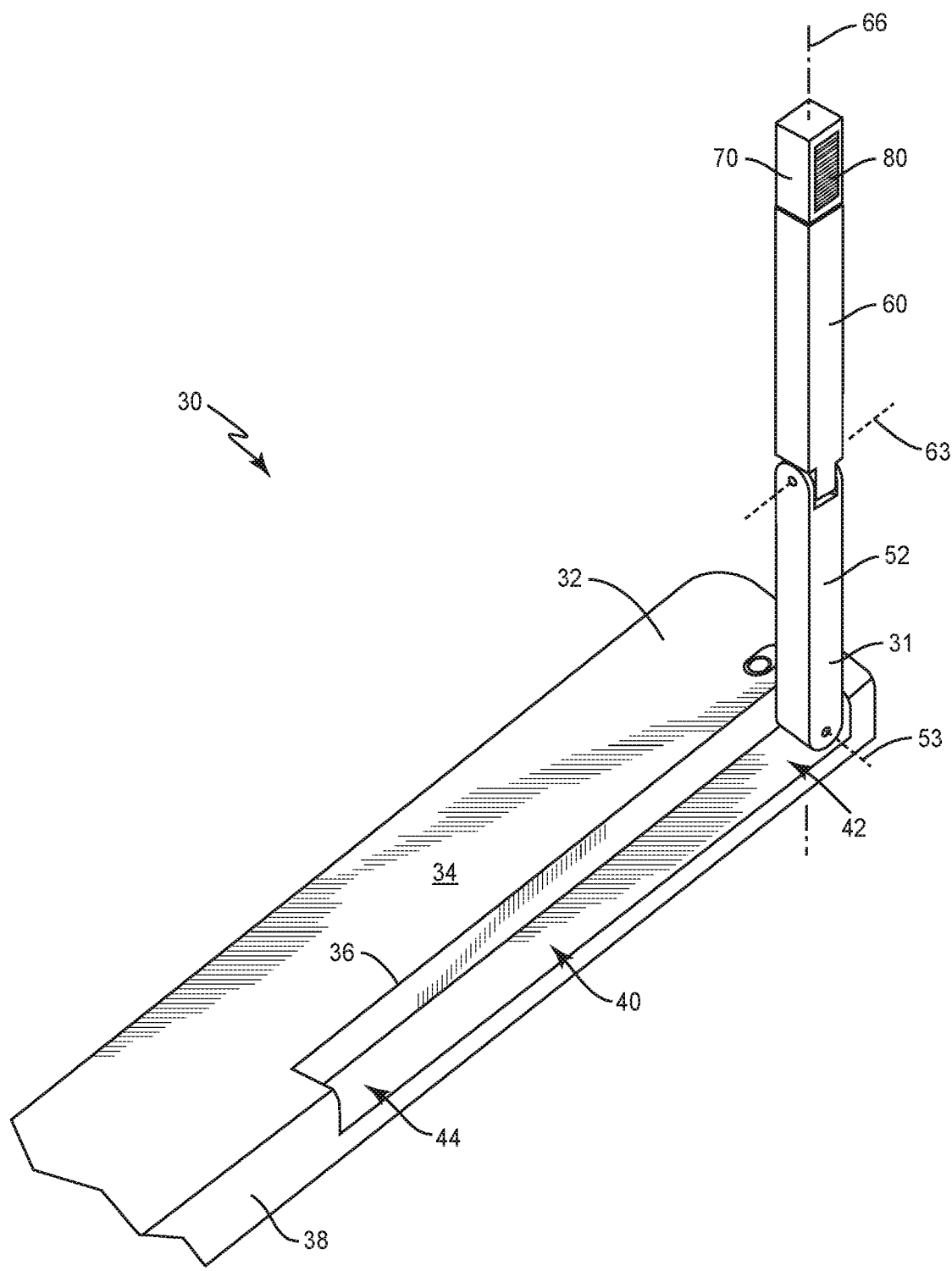

FIG. 5 shows a perspective view of the armrest assembly of FIG. 3 in a first deployed configuration.

Figure 6:
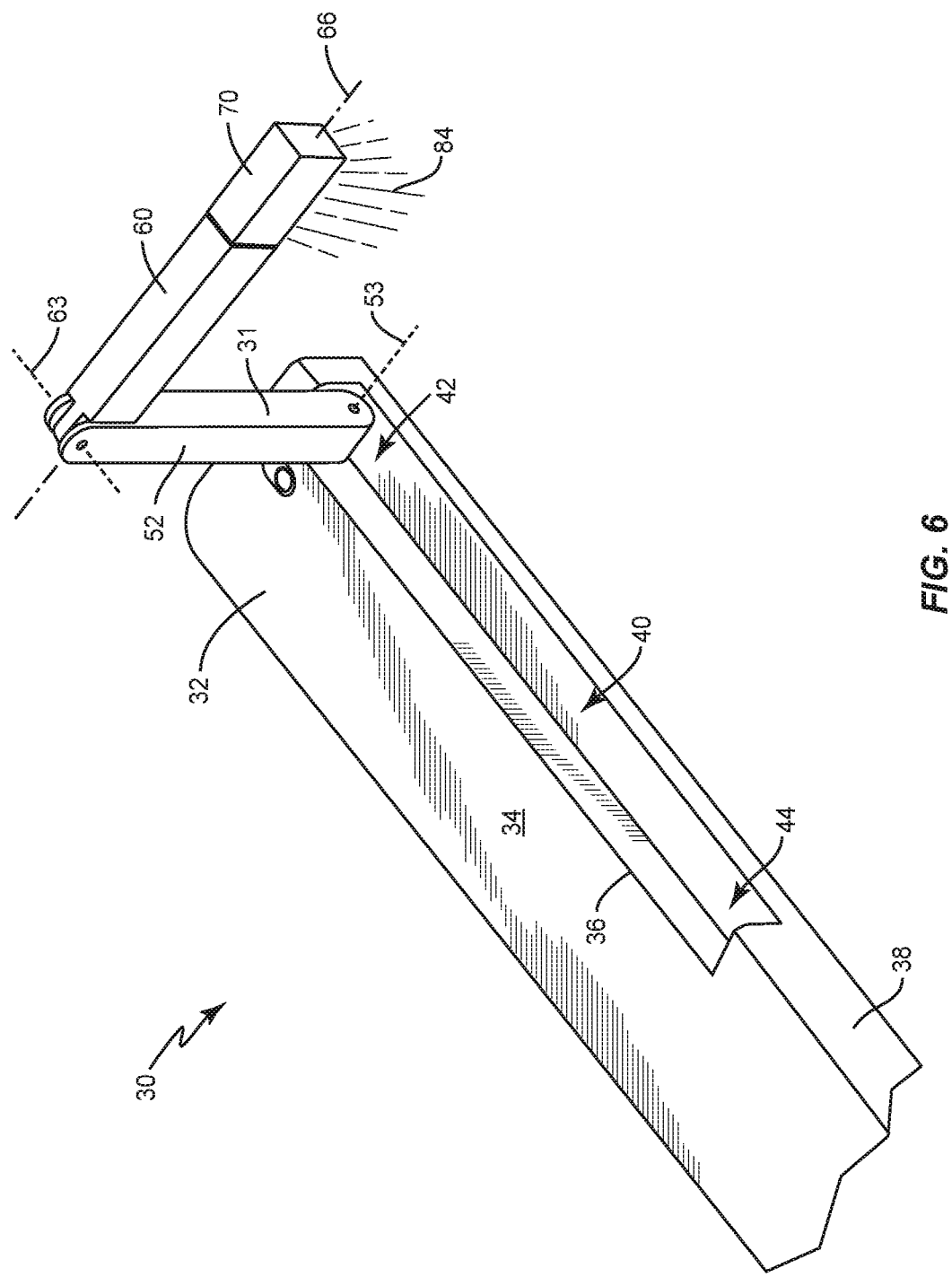

FIG. 6 shows a perspective view of the armrest assembly of FIG. 3 in a second deployed configuration.

Figure 7:
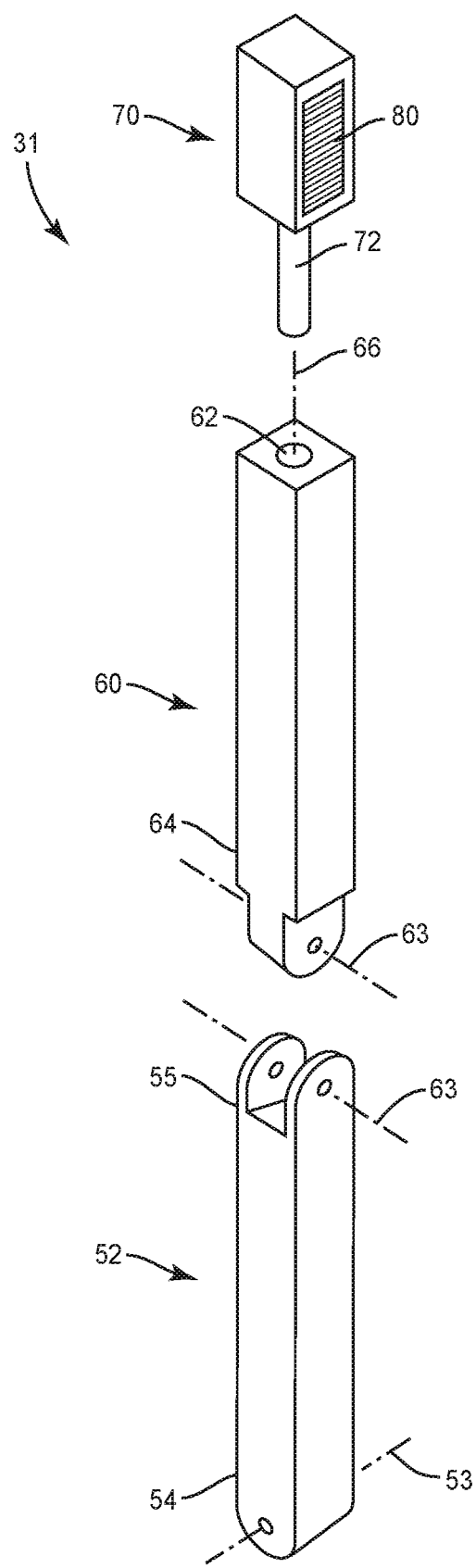

FIG. 7 shows a partially exploded view of the light assembly of FIG. 4.

Figure 8:
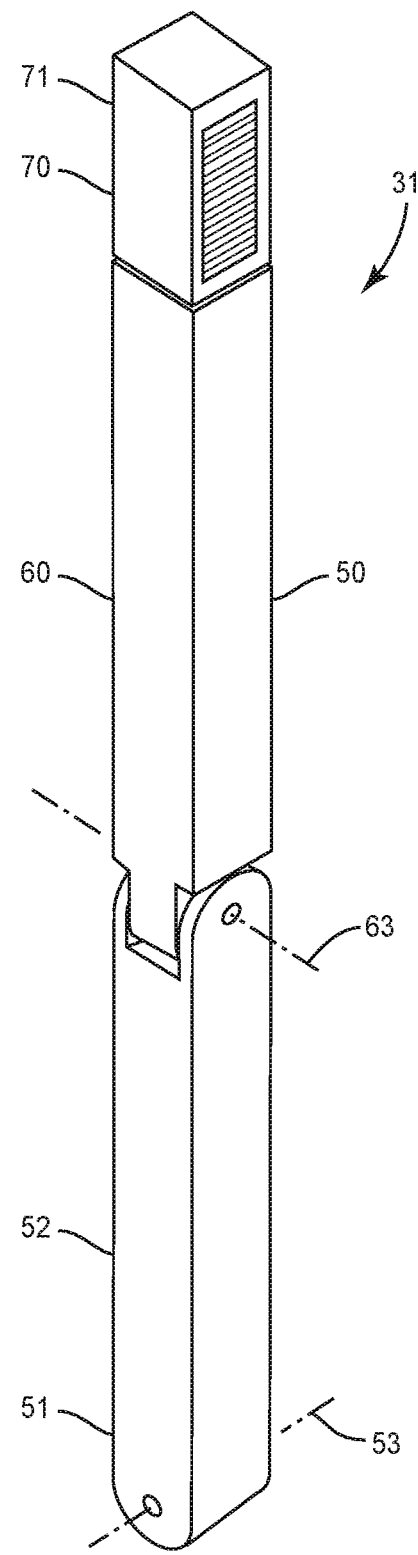

FIG. 8 shows a view of the light assembly of FIG. 4 when in the stowed configuration and/or when in a partially deployed configuration.

Figure 9:
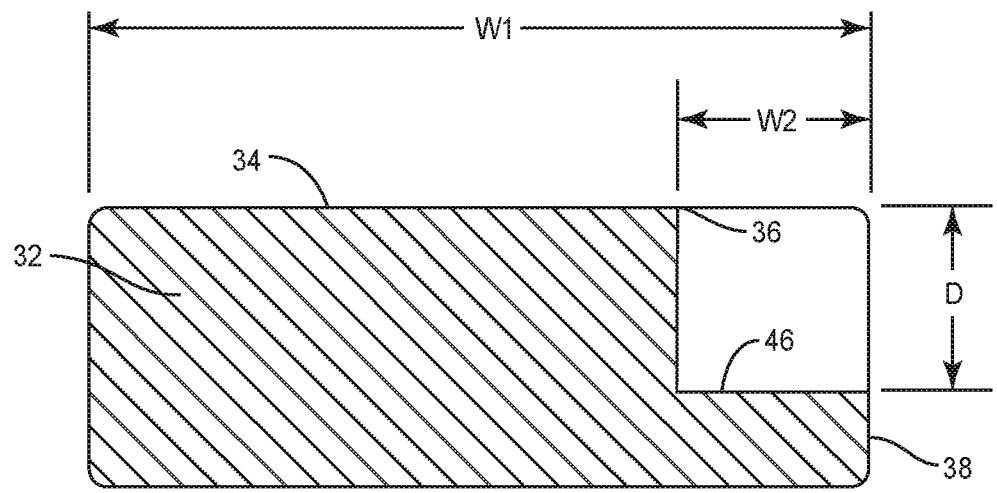

FIG. 9 shows a partial cross-sectional view of the armrest assembly of FIG. 4, along line B-B, with the articulating support and light source of the light assembly omitted.

Figure 10:
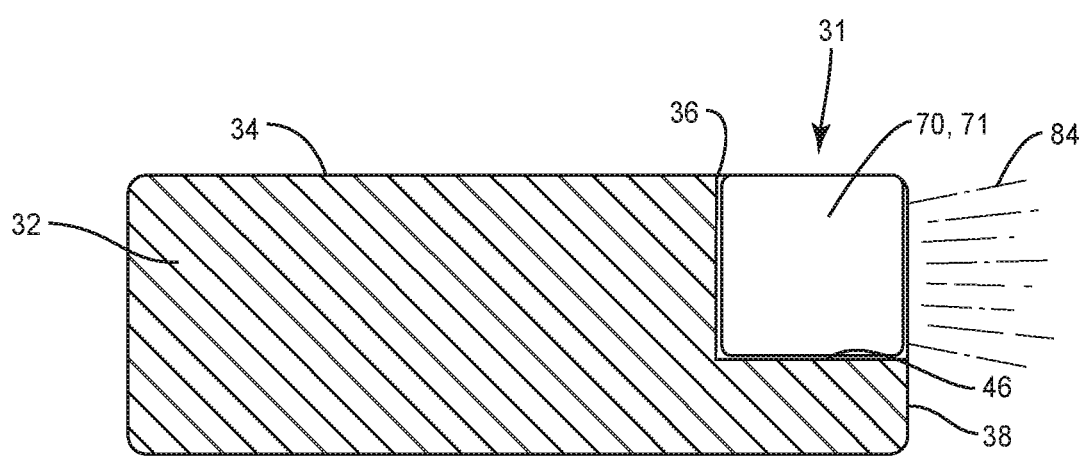

FIG. 10 shows a partial cross-sectional view of the armrest assembly of FIG. 4, along line B-B, with the light assembly in the stowed configuration.

Figure 11:
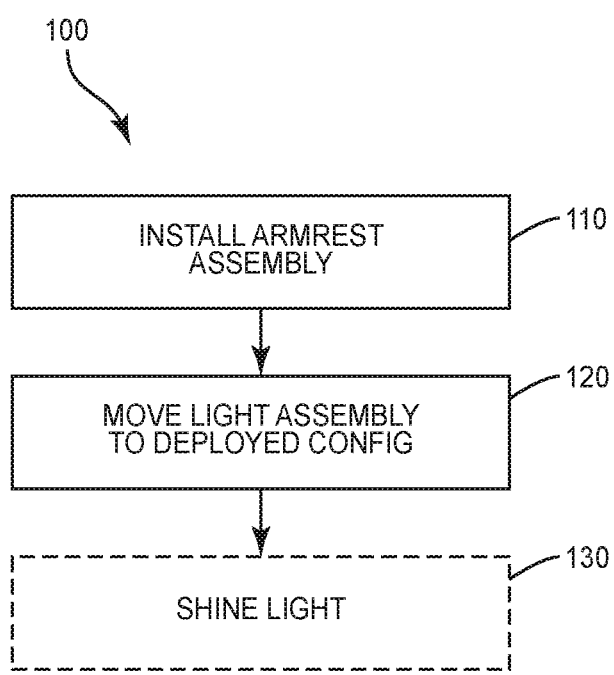

FIG. 11 shows a flowchart pertaining to aspects of the present disclosure.

DETAILED DESCRIPTION

Aspects of the present disclosure are directed to an armrest assembly 30 that includes a light source 80, a seat assembly 20 that includes the armrest assembly 30, and related method(s) of manufacturing or servicing. In general, the armrest assembly 30 includes a light assembly 31 and an armrest 32. The light assembly 31 includes light source 80 that is supported by an articulating support 50 such that it can be positioned in a variety of locations. The articulating support 50 is pivotally mounted to an armrest 32 in a forward portion 42 of a side notch 40 that extends along the lateral edge 36 of the armrest 32. The armrest assembly 30 is configured such that the light source 80 is disposed in the side notch 40 and oriented to direct light 84 from the side notch 40 away from the armrest 32 when the light assembly 31 is in a stowed configuration. The articulating support 50 may be moved so that the light source 80 is disposed out of the side notch 40, so as to provide a reading light.

Referring to FIGS. 1-2, an exemplary aircraft 10 is shown. The aircraft 10 has a passenger cabin 12. Typically, a plurality of seats 22 are positioned in the passenger cabin 12 for supporting passengers during transit. In some aspects, the seats 22 are arranged in rows, and some adjacent seats 22 are affixed in groups, such as in three-seat arrangements. A seat back 24 is associated with each passenger seat 22. Each passenger seat 22 has one or more armrests 32. One or more of the armrests 32 are provided by an armrest assembly 30. See FIGS. 3-10. Note that, for simplicity, an aircraft 10 is used as an illustrative example of a passenger vehicle; but the passenger vehicle is, in various aspects, any of an aircraft 10, a watercraft, and/or a land vehicle. Thus, in some aspects, the armrest assembly 30 described herein is disposed in a passenger cabin 12 of an aircraft 10.

The armrest assembly 30 includes an armrest 32 and a light assembly 31. The armrest 32 has an upper surface 34 extending along a first longitudinal axis 39. The upper surface 34 is configured to support a passenger's arm during transit in the aircraft 10. The armrest 32 has a side notch 40 defined therein. The side notch 40 is disposed at a lateral edge 36 of the upper surface 34 such that the side notch 40 defines a lateral boundary of the upper surface 34. Being disposed at the lateral edge 36 of the upper surface 34, the side notch 40 is disposed at the conceptual corner between the upper surface 34 of the armrest 32 and a side surface 38 of the armrest 32 (e.g., the side oriented toward the passenger seat 22); see FIG. 8. Thus, there is a vertical offset D between the upward facing upper surface 34 of the armrest 32, and the upward facing upper surface 46 of the side notch 40. The side notch 40 extends parallel to the first longitudinal axis 39. The side notch 40 has a forward portion 42 and a rearward portion 44, with the rearward portion 44 disposed nearer the rear of the passenger seat 22 (toward the seat back 24), and the forward portion 42 disposed nearer the front of the passenger seat 22. In some aspects, the side notch 40 has a lateral width W2 that is not more than 20% of a lateral width W1 of the upper surface 34 of the armrest 32.

The light assembly 31 is moveably mounted to the armrest 32 and includes an articulating support 50 and a light source 80. The articulating support 50 has a base section 51 pivotally mounted to the armrest 32 in the forward portion 42 of the side notch 40 and an opposing free end 71. The light source 80 is mounted to the articulating support 50 so as to be closer to the free end 71 than the base section 51. Referring to FIGS. 7-8, in some aspects, the articulating support 50 includes a first segment 52, a second segment 60, and a third segment 70, arranged in series. The first segment 52 is moveably mounted to the armrest 32 in the forward portion 42 of the side notch 40 for rotation about a first pivot axis 53. The first pivot axis 53 advantageously coincides with a shaft of the armrest 32 that extends laterally into the side notch 40. The first segment 52 has a proximal portion 54 through which the first pivot axis 53 extends, and a distal portion 55. In some aspects, the first segment 52 is moveably mounted to the armrest 32 so as to be constrained to a single degree of freedom relative to the armrest 32 (i.e., rotation about the first pivot axis 53). The first segment 52 acts as the base section 51. The first segment 52 is advantageously longitudinally rigid and straight.

The second segment 60 is moveably mounted to the distal portion 55 of the first segment 52 for rotation relative to the first segment 52. In some aspects, the second segment 60 is moveably mounted to the distal portion 55 of the first segment 52 for rotation about a second pivot axis 63 that extends through the distal portion 55 of the first segment 52 and a proximal portion 64 of the second segment 60. In some aspects, the second pivot axis 63 is orthogonal to the first pivot axis 53. In some aspects, the second segment 60 is constrained to a single degree of freedom relative to the first segment 52 (i.e., rotation about the second pivot axis 63). The second segment 60 extends along a second longitudinal axis 66. The second segment 60 is advantageously longitudinally rigid and straight.

The third segment 70 is moveably mounted to the second segment 60 opposite the first segment 52. In some aspects, the third segment 70 is constrained to remain disposed parallel to the second segment 60 and constrained to a single degree of freedom relative to the second segment 60. For example, the third segment 70 may include a post 72 that extends into a corresponding hole 62 in the second segment 60, with the hole 62 aligned with the second longitudinal axis 66 of the second segment 60. Thus, the third segment 70 is rotatable relative to the second segment 60 about the second longitudinal axis 66 of the second segment 60. In some aspects, the third segment 70 is rotatable 360° relative to the second segment 60 about the second longitudinal axis 66 of the second segment 60. In other aspects, the rotation of the third segment 70 is limited to less than 360°, such as 330°, 270°, 180°, 120°, or 90°. The third segment 70 acts as the free end 71. The third segment 70 is advantageously longitudinally rigid and straight.

The light source 80 is advantageously disposed in the third segment 70. The light source 80 is of any suitable type, such as one or more LEDs, a light bulb, an emitting end of an optical fiber, or the like. The light source 80 is optionally covered by a suitable lens or protective cover (not shown), which is optionally colored/tinted. Power/light is supplied to the light source 80 in any suitable manner, such as post and ring electrical connections, wires, flexible circuit traces, etc.

The light assembly 31 is movable between a stowed configuration and at least one deployed configuration. When the light assembly 31 is in the stowed configuration: 1) both the articulating support 50 and the light source 80 of the light assembly 31 are disposed in the side notch 40; 2) the articulating support 50 (including base section 51 and free end 71) is disposed parallel to the first longitudinal axis 39; and 3) the light source 80 is oriented to direct light 84 from the side notch 40 away from the armrest 32. See FIG. 4. When the light assembly 31 is in the deployed configuration: 1) the free end 71 of the articulating support 50 is disposed outside the side notch 40; and 2) the light source 80 is disposed outside the side notch 40. See FIG. 5 and FIG. 6. Note that at least a portion of the base section 51 remains disposed in the side notch 40 in the deployed configuration. FIG. 5 illustrates a first deployed configuration, where the first segment 52, second segment 60, and third segment 70 of the articulating support 50 are arranged linearly, but oriented transverse to the first longitudinal axis 39 of the armrest 32. FIG. 6 illustrates a second deployed configuration, where the second segment 60 and third segment 70 are linearly arranged relative to each other, but disposed transverse to the first segment 52, and the first segment 52 is oriented transverse to the first longitudinal axis 39 of the armrest 32. The second deployed configuration may be referred to as the "fully deployed" configuration. In the second deployed configuration, the second segment 60 is advantageously perpendicular to the first segment 52, although other relative angular positions are also contemplated.

In some aspects, when the light assembly 31 is in the stowed configuration, the light source 80 is oriented to direct light 84 from the side notch 40 laterally away from the armrest 32. In other aspects, when the light assembly 31 is in the stowed configuration, the light source 80 is oriented to direct light 84 from the side notch 40 vertically away from the armrest 32. In some aspects, the cross-sectional height of the articulating support 50 is advantageously equal to the vertical offset D, so that, in the stowed configuration, the light assembly 31 forms a continuation of upper surface 34 of armrest 32, and/or the cross-sectional width of the articulating support 50 is advantageously equal to the lateral width of the side notch 40, so that, in the stowed configuration, the light assembly 31 forms a continuation of side surface of armrest 32. See FIG. 10.

In some aspects, the pivoting connections between the first segment 52 and the armrest 32, and/or between the first segment 52 and second segment 60, and/or between the second segment 60 and the third segment 70, are provided with suitable detents, friction connections, or the like to all the corresponding connections to be selectively/releasably held in at a desired relative angular position.

In some aspects, a switch 90 is disposed on the upper surface 34 of the armrest 32, with the switch 90 operatively connected to the light source 80 and operative to control an on/off state of the light source 80. In some aspects, light source 80 automatically turns on when the light assembly 31 is moved to the deployed configuration, and shuts off when the light assembly 31 is moved to the stowed configuration, with the switch 90 optionally providing an override function to allow the light source 80 to be turned on by the passenger when the light assembly 31 is in the stowed configuration. The switch 90 optionally provides brightness control for the light source 80.

In some aspects, the light source 80 may be operatively connected to the emergency lighting systems of the passenger vehicle (e.g., aircraft 10), if present, so that the light source 80 may be automatically turned on in emergency situations.

In some aspects, a seat assembly 20 is provided. The seat assembly 20 includes a passenger seat 22 and the armrest assembly 30 described above. Thus, the seat assembly 20 includes armrest assembly 30 disposed adjacent to the passenger seat 22, with the armrest assembly 30 including an armrest 32 and a light assembly 31. The armrest 32 has the upper surface 34 extending along a first longitudinal axis 39. The armrest 32 has the side notch 40 defined therein, with the side notch 40 extending parallel to the first longitudinal axis 39 and disposed at a lateral edge 36 of the upper surface 34 such that the side notch 40 defines a lateral boundary of the upper surface 34. The side notch 40 has a forward portion 42 and a rearward portion 44. The light assembly 31 is moveably mounted to the armrest 32 and has an articulating support 50 and a light source 80. The articulating support 50 has a base section 51 pivotally mounted to the armrest 32 in the forward portion 42 of the side notch 40 and an opposing free end 71. The light source 80 is mounted to the articulating support 50 so as to be closer to the free end 71 than the base section 51. The light assembly 31 is movable between a stowed configuration and at least one deployed configuration. When the light assembly 31 is in the stowed configuration: 1) both the articulating support 50 and the light source 80 of the light assembly 31 are disposed in the side notch 40; 2) the articulating support 50 (including base section 51 and free end 71) is disposed parallel to the first longitudinal axis 39; and 3) the light source 80 is oriented to direct light 84 from the side notch 40 away from the armrest 32. When the light assembly 31 is in the deployed configuration: 1) the free end 71 of the articulating support 50 is disposed outside the side notch 40; and 2) the light source 80 is disposed outside the side notch 40. In some aspects, when the light assembly 31 is in the stowed configuration, the light source 80 is oriented to direct light 84 from the side notch 40 laterally away from the armrest 32 toward the passenger seat 22. Such lateral directing of the light provides a passenger with side lighting, which may help in locating dropped items and/or otherwise illuminating items in/near the passenger's lap when appropriate.

In other aspects, the armrest assembly 30 described herein may be used in a method of manufacturing or servicing an aircraft 10 having a passenger cabin 12. The method (100) includes installing (110) the armrest assembly 30 in the passenger cabin 12 adjacent a passenger seat 22. The armrest assembly 30 includes an armrest 32 and a light assembly 31. The armrest 32 has an upper surface 34 extending along a first longitudinal axis 39. The armrest 32 has a side notch 40 defined therein, with the side notch 40 extending parallel to the first longitudinal axis 39 and disposed at a lateral edge 36 of the upper surface 34 such that the side notch 40 defines a lateral boundary of the upper surface 34. The side notch 40 has a forward portion 42 and a rearward portion 44. The light assembly 31 is moveably mounted to the armrest 32 and has an articulating support 50 and a light source 80. The articulating support 50 has a base section 51 pivotally mounted to the armrest 32 in the forward portion 42 of the side notch 40 and an opposing free end 71. The light source 80 is mounted to the articulating support 50 so as to be closer to the free end 71 than the base section 51. The light assembly 31 is movable between a stowed configuration and at least one deployed configuration. When the light assembly 31 is in the stowed configuration: 1) both the articulating support 50 (including base section 51 and free end 71) and the light source 80 of the light assembly 31 are disposed in the side notch 40; 2) the articulating support 50 is disposed parallel to the first longitudinal axis 39; and 3) the light is oriented to direct light 84 from the side notch 40 away from the armrest 32. When the light assembly 31 is in the deployed configuration: 1) the free end of the articulating support 50 is disposed outside the side notch 40; and 2) the light is disposed outside the side notch 40. In some aspects, the method further includes 1) moving (120) the light assembly 31 from the stowed configuration to the deployed configuration; and 2) shining (130) light from the light source 80 toward the passenger seat 22 while the light assembly 31 is in the deployed configuration.

The various portions of the light assembly 31, armrest assembly 30, and/or seat assembly 20 are made from any suitable materials, such as aluminum, steel, plastic (with or without reinforcement), foam, etc. The materials chosen should be strong enough to support the passenger with suitable safety margin. And, in some aspects, the articulating support 50 of the light assembly 31 optionally includes cushioning on the perimeter surfaces thereof that face upward and/or laterally toward the seat 22 in the stowed configuration, to increase passenger comfort when the passenger rests their arm on the articulating support 50 in the stowed configuration. Likewise, the cross-sectional edges/corners of the articulating support 50 are optionally rounded as appropriate to provide appropriate ergonomic surfaces for the passenger.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. An armrest assembly for a passenger vehicle, the armrest assembly comprising:

armrest having an upper surface extending along a first longitudinal axis, the armrest having a side notch defined therein, the side notch extending parallel to the first longitudinal axis and disposed at a lateral edge of the upper surface such that the side notch defines a lateral boundary of the upper surface; the side notch having a forward portion and a rearward portion;

a light assembly moveably mounted to the armrest and having an articulating support and a light source, wherein the articulating support has a base section pivotally mounted to the armrest in the forward portion of the side notch and an opposing free end; wherein the light source is mounted to the articulating support so as to be closer to the free end than the base section;

wherein the light assembly is movable between a stowed configuration and at least one deployed configuration;

wherein, when the light assembly is in the stowed configuration:

both the articulating support and the light source of the light assembly are disposed in the side notch;

the articulating support is disposed parallel to the first longitudinal axis; and the light source is oriented to direct light from the side notch away from the armrest;

wherein, when the light assembly is in the deployed configuration:

the free end of the articulating support is disposed outside the side notch; and the light source is disposed outside the side notch.

2. The armrest assembly of claim 1:

wherein the articulating support comprises a first segment, a second segment, and a third segment, arranged in series;

wherein the first segment is moveably mounted to the armrest in the forward portion of the side notch for rotation about a first pivot axis; the first segment having a proximal portion through which the first pivot axis extends, and a distal portion;

wherein the second segment is moveably mounted to the distal portion of the first segment for rotation relative to the first segment;

wherein the third segment is moveably mounted to the second segment opposite the first segment; and wherein the light source is disposed in the third segment.

3. The armrest assembly of claim 2:

wherein the third segment is constrained to remain disposed parallel to the second segment and constrained to a single degree of freedom relative to the second segment; and wherein the third segment is rotatable relative to the second segment about a second longitudinal axis of the second segment.

4. The armrest assembly of claim 3, wherein the third segment is rotatable 360° relative to the second segment about the second longitudinal axis of the second segment.

5. The armrest assembly of claim 2:
wherein the second segment is moveably mounted to the distal portion of the first segment for rotation about a second pivot axis that extends through the distal portion of the first segment;
wherein the second segment is constrained to a single degree of freedom relative to the first segment; and
wherein the second pivot axis is orthogonal to the first pivot axis.

6. The armrest assembly of claim 1, wherein the side notch has a lateral width that is not more than 20% of a lateral width of the upper surface of the armrest.

7. The armrest assembly of claim 1, wherein, when the light assembly is in the stowed configuration, the light source is oriented to direct light from the side notch laterally away from the armrest.

8. The armrest assembly of claim 1, further comprising a switch disposed on the upper surface of the armrest, the switch operatively connected to the light source and operative to control an on/off state of the light source.

9. The armrest assembly of claim 1, wherein the armrest assembly is disposed in a passenger cabin of an aircraft.

10. A seat assembly for a passenger vehicle, the seat assembly comprising:
a passenger seat;
an armrest assembly disposed adjacent the passenger seat, the armrest assembly comprising:
armrest having an upper surface extending along a first longitudinal axis, the armrest having a side notch defined therein, the side notch extending parallel to the first longitudinal axis and disposed at a lateral edge of the upper surface such that the side notch defines a lateral boundary of the upper surface; the side notch having a forward portion and a rearward portion;
a light assembly moveably mounted to the armrest and having an articulating support and a light source, wherein the articulating support has a base section pivotally mounted to the armrest in the forward portion of the side notch and an opposing free end;
wherein the light source is mounted to the articulating support so as to be closer to the free end than the base section;
wherein the light assembly is movable between a stowed configuration and at least one deployed configuration;
wherein, when the light assembly is in the stowed configuration:
both the articulating support and the light source of the light assembly are disposed in the side notch;
the articulating support is disposed parallel to the first longitudinal axis; and
the light source is oriented to direct light from the side notch away from the armrest;
wherein, when the light assembly is in the deployed configuration:
the free end of the articulating support is disposed outside the side notch; and
the light source is disposed outside the side notch.

11. The seat assembly of claim 10:
wherein the articulating support comprises a first segment, a second segment, and a third segment, arranged in series;
wherein the first segment is moveably mounted to the armrest in the forward portion of the side notch for rotation about a first pivot axis; the first segment having a proximal portion through which the first pivot axis extends, and a distal portion;
wherein the second segment is moveably mounted to the distal portion of the first segment for rotation relative to the first segment;
wherein the third segment is moveably mounted to the second segment opposite the first segment; and
wherein the light source is disposed in the third segment.

12. The seat assembly of claim 11:
wherein the third segment is constrained to remain disposed parallel to the second segment and constrained to a single degree of freedom relative to the second segment; and
wherein the third segment is rotatable relative to the second segment about a second longitudinal axis of the second segment.

13. The seat assembly of claim 11:
wherein the second segment is moveably mounted to the distal portion of the first segment for rotation about a second pivot axis that extends through the distal portion of the first segment;
wherein the second segment is constrained to a single degree of freedom relative to the first segment; and
wherein the second pivot axis is orthogonal to the first pivot axis.

14. The seat assembly of claim 10, wherein the side notch has a lateral width that is not more than 20% of a lateral width of the upper surface of the armrest.

15. The seat assembly of claim 10, wherein, when the light assembly is in the stowed configuration, the light source is oriented to direct light from the side notch laterally away from the armrest toward the passenger seat.

16. The seat assembly of claim 10, further comprising a switch disposed on the upper surface of the armrest, the switch operatively connected to the light source and operative to control an on/off state of the light source.

17. A method of manufacturing or servicing an aircraft having a passenger cabin, the method comprising:
installing an armrest assembly in the passenger cabin adjacent a passenger seat;
the armrest assembly comprising:
armrest having an upper surface extending along a first longitudinal axis, the armrest having a side notch defined therein, the side notch extending parallel to the first longitudinal axis and disposed at a lateral edge of the upper surface such that the side notch defines a lateral boundary of the upper surface; the side notch having a forward portion and a rearward portion;
a light assembly moveably mounted to the armrest and having an articulating support and a light source, wherein the articulating support has a base section pivotally mounted to the armrest in the forward portion of the side notch and an opposing free end; wherein the light source is mounted to the articulating support so as to be closer to the free end than the base section;
wherein the light assembly is movable between a stowed configuration and at least one deployed configuration;
wherein, when the light assembly is in the stowed configuration:
both the articulating support and the light source of the light assembly are disposed in the side notch;

the articulating support is disposed parallel to the first longitudinal axis; and the light is oriented to direct light from the side notch away from the armrest;

wherein, when the light assembly is in the deployed configuration:

the free end of the articulating support is disposed outside the side notch; and the light is disposed outside the side notch.

18. The method of claim 17:

wherein the articulating support comprises a first segment, a second segment, and a third segment, arranged in series;

wherein the first segment is moveably mounted to the armrest in the forward portion of the side notch for rotation about a first pivot axis; the first segment having a proximal portion through which the first pivot axis extends, and a distal portion;

wherein the second segment is moveably mounted to the distal portion of the first segment for rotation relative to the first segment;

wherein the third segment is moveably mounted to the second segment opposite the first segment; and wherein the light source is disposed in the third segment.

19. The method of claim 18:

wherein the third segment is constrained to remain disposed parallel to the second segment and constrained to a single degree of freedom relative to the second segment; and wherein the third segment is rotatable relative to the second segment about a second longitudinal axis of the second segment.

20. The method of claim 17, further comprising:

moving the light assembly from the stowed configuration to the deployed configuration; and shining light from the light source toward the passenger seat while the light assembly is in the deployed configuration.

\* \* \* \* \*